United States Patent
Lection et al.

(10) Patent No.: US 6,198,472 B1
(45) Date of Patent: Mar. 6, 2001

(54) SYSTEM INTEGRATED 2-DIMENSIONAL AND 3-DIMENSIONAL INPUT DEVICE

(75) Inventors: David Bruce Lection, Raleigh; Mark Edward Molander, Cary; Mohamad R. Salahshoor; John Lane Scanlon, both of Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/154,136

(22) Filed: Sep. 16, 1998

(51) Int. Cl.[7] .................................................... G09G 5/08
(52) U.S. Cl. .............................................................. 345/161
(58) Field of Search ..................................... 345/161, 163

(56) References Cited

U.S. PATENT DOCUMENTS

| | | | |
|---|---|---|---|
| 4,156,130 | * | 5/1979 | Ivashin et al. ......................... 235/92 |
| 5,187,468 | * | 2/1993 | Garthwaite et al. ................. 340/709 |
| 5,469,193 | * | 11/1995 | Giobbi et al. ........................ 345/158 |
| 5,521,596 | * | 5/1996 | Selker et al. ........................... 341/22 |
| 5,912,661 | * | 6/1999 | Siddiqui ................................ 345/166 |

* cited by examiner

*Primary Examiner*—Chanh Nguyen
*Assistant Examiner*—William C. Spencer
(74) *Attorney, Agent, or Firm*—Jeanine S. Ray-Yarletts; Marcia L. Doubet

(57) ABSTRACT

A system-integrated input device for manipulating objects on the display of a computer screen. The device is integrated as a pointer stick, which may be located on an existing keyboard, on an existing mouse device, or elsewhere. Both 2-dimensional and 3-dimensional user input are supported. In a first embodiment, the device is easily convertible between 2D and 3D input mode. Preferably, this conversion occurs by pressing down on the pointer stick, which is implemented as a spring-loaded device. The device supports input in the X and Y direction while in 2D mode, and adds the Z direction while in 3D mode. Movement in the Z direction is indicated by rotating the pointer stick to the left or right. In a second embodiment, movement in the Z direction is indicated by pushing and pulling on a sliding, or telescoping, pointer stick.

3 Claims, 4 Drawing Sheets

Side View

Top View

Side View

Top View

Side View

SYSTEM INTEGRATED 2-DIMENSIONAL AND 3-DIMENSIONAL INPUT DEVICE

BACKGROUND OF THE INVENTION

1. Field of the Invention

The present invention relates to the field of input devices for communicating with computer systems, and more particularly to an integrated device that supports both 2 dimensional and 3 dimensional input to manipulate objects on a display of the computer system.

2. Description of the Related Art

Human users communicate with computers using various types of input devices, and computer systems typically include a means to communicate back to the user. The communication from a computer to the user is most commonly provided using a display screen on a device such as a CRT (cathode ray tube) monitor. The types of input devices available to the user include keyboards and speech recognizers. When a graphical user interface ("GUI") is provided on the display screen, additional types of input are often used to enable the user to interact with the graphical objects displayed thereupon. This interaction includes selecting options, highlighting objects, moving objects and a performing a variety of other tasks on the computer system, with visual feedback provided by the images on the computer screen, as is well known in the art. These tasks require movement of a cursor (or other pointing device, equivalently) on the display screen. Additional device types enable the cursor movement, and include: keys defined on the keyboard to provide directional cursor movement (such as the "arrow" keys used to indicate movement up and down, and left and right); mouse devices; light pens; joysticks; track balls; and touch sensitive pads that detect finger movement on a surface. The user's movement of each device is translated into positional coordinate information or commands which the computer is able to interpret and utilize to move the cursor appropriately.

Some of these devices may be integrated directly into the computer, such as the keyboard which is integrated into a laptop or other portable computer. Other devices, such as mice or joysticks, are separate from the computer. Some of the devices support input in 2 dimensions, while others support input in 3 dimensions. Mice are examples of the former, while joysticks are available that are examples of the latter. A 2-dimensional input device allows the user to move the cursor in X and Y directions, where the X axis is typically considered to be a left-and-right movement and the Y axis is considered to be an up-and-down movement. Movement in X and Y directions is sufficient to handle the requirements of most computer software applications, since most applications display 2-dimensional ("2D") images on the 2-dimensional display screen. 3-dimensional ("3D") user interfaces are becoming increasingly more popular, as more and more applications support 3-dimensional images. With these applications, the ability to provide input in a third dimension, for the Z axis, is required. This third dimension allows the user, for example, to select a particular location within a 3-dimensional image; to select an item from a 3-dimensional menu; to move the displayed image in and out on the display; etc.

The current art in 2D devices gives 4 degrees of freedom, which may be referred to as +X, −X, +Y, and −Y. 2D input devices integrated within keyboards are known, and include the International Business Machines Corporation ("IBM") TrackPoint, touch pads, track balls, etc. "TrackPoint" is a registered trademark of IBM. The TrackPoint may be described as a pointer stick, and resembles a small "pencil eraser"—like object. This pointer stick is placed between the G, H, and B keys when located on a keyboard, as shown in FIG. 1. This type of pointer stick may also be integrated within a mouse. When located on a mouse, the pointer stick is typically positioned between the existing mouse buttons. The user pushes the pointer stick left or right, forward or backward, to indicate cursor movement in the X and Y directions. When a 3D input device is required, the user must typically plug in a separate device, such as a joystick. This device then enables input in 6 degrees of freedom, adding +Z and −Z to the 4 degrees supported in 2D input.

Devices are known which were designed for 2D input, and which have been modified to provide input in 3 dimensions. However, none of these devices are known to be both integrated and convertible, as well as easy to use, while supporting continuous rotation in the Z-axis direction. Further, no devices are known which are integrated, and which use a sliding pointer stick for Z-axis input. Trackballs, for example, have been modified to support 3D input. In the original 2D input mode, the user rotates the track ball left and right, forward and backward. The modification allows the user to rotate the ball clockwise and counterclockwise, for a third input dimension. However, this technique is very cumbersome in operation, and tends to be error-prone. For example, the user may easily stray too far in the downward movement when attempting a clockwise rotation, so that his attempt to provide a Z input becomes an unintended-X (negative X) input.

Requiring a separate input device for 3D input makes the computer system more expensive, and cumbersome due to the requirement for a separate external cable with which the device is attached to the computer. The computer becomes more difficult to configure as extra devices are added, because each device typically requires the user to install a special device driver software package. Further, portable computers are becoming increasingly popular. These portable computers become more difficult to work with, and less portable, when the user must carry extra devices (and their cables) along. And when operating the portable computer in a limited-space environment, such as when using a so-called "laptop computer" on one's lap, a separate device is much more cumbersome since it is not physically anchored to the computer system. The user must hold not only the computer, but also the input device. And in the case of a mouse device, a surface on which to roll the mouse must be available, in order to generate the signals indicating the user's input request which will then be passed to the computer.

As 3D software applications become more prevalent, users will want to be able to change between 2D and 3D mode (i.e. using an application that requires input in 2 dimensions, and then using an application that requires input in 3 dimensions) easily and quickly. Requiring the user to change input devices will greatly limit the acceptance of 3D programs, and will likely cause user dissatisfaction. Further, users may want to have both 2D and 3D applications active simultaneously. Most computers provide a single port for attaching a separate non-integrated input device. If separate 2D and 3D devices are required, both being non-integrated, the user will not have the ability to work in this mode: he will have to choose between using a 2D input device, or a 3D input device, at a given point in time.

Accordingly, what is needed is an improved controller device for providing input that signals a user's request to manipulate objects on the display. This device should be an easy-to-use, system-integrated input device that supports both 2-dimensional and 3-dimensional input. In a first embodiment, the present invention provides a pointer stick device that operates in 2D mode in a first position, and 3D mode in a second position. The user converts the pointer stick between 3D and 2D mode by pushing on it. In a second embodiment, the pointer stick device provides 3D input by adding detection of push and pull movement of a sliding, or telescoping, embodiment of the device, for Z-axis input.

SUMMARY OF THE INVENTION

An object of the present invention is to provide an improved controller device for manipulating multi-dimensional objects on a display screen of a computer.

A further object of the present invention is to provide a convertible, system-integrated input device that supports both 2-dimensional and 3-dimensional input.

Additionally, it is an object of the present invention to provide a convenient means to switch between 2 dimensional and 3 dimensional modes using an existing pointer stick control.

Yet another object of the present invention is to provide a system-integrated input device that uses a sliding pointer stick to indicate Z-axis movement.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides an improved controller device for manipulating objects on a display screen of a computer system. In a first embodiment, this device comprises: an input mechanism which is integrated into the computer system, wherein the input mechanism is convertible by a user between a 2-dimensional input mode and a 3-dimensional input mode; and means for providing input signals generated by the input mechanism to the computer system, wherein the input signals indicate the user's request to move a pointer symbol on the display screen. The input mechanism is preferably in a first position for the 2-dimensional input mode, and in a second position for the 3-dimensional input mode. The 3-dimensional input mode enables the user's request to include a Z-axis signal. Preferably, the user rotates the pointer stick device in a first direction to indicate a +Z signal, and in a second opposite direction to indicate a −Z signal. The device may be integrated into a keyboard of the system, or it may be integrated into a device attachable to the system, or elsewhere. The convertible input mechanism is preferably converted between the 2-dimensional mode and the 3-dimensional input mode by popping up and pushing down on the input mechanism. Preferably, the input mechanism is a pointer stick device. In a second embodiment, the device comprises: an input mechanism which is integrated into the computer system, wherein the input mechanism is a sliding pointer stick; and means for providing input signals generated by the input mechanism in three dimensions to the computer system, wherein the input signals indicate a user's request to move a pointer symbol on the display screen. Preferably, the means for providing input signals further comprises detecting push and pull forces exerted on the device by the user, and wherein a first of said push and pull forces indicates a +Z signal and a second indicates a −Z signal.

DESCRIPTION OF THE PREFERRED EMBODIMENT

The preferred embodiment of the present invention allows for users of computers to exploit both 2 and 3 dimensional application and operating system views using an integrated pointer stick device. The device is integrated, in that it is located on an existing keyboard, on an existing mouse device, or elsewhere. (For example, the device could be located below the spacebar of the computer keyboard, in an unused corner of a computer's keyboard surface, etc.) This is particularly advantageous for portable computer users where space, seating, table areas or other flat surfaces are either limited or do not exist. By using an integrated device, the user has the benefit of using only one hand to simultaneously provide input in 6 degrees of freedom. Further, these degrees of freedom are clearly separable from one another, enabling the user to unambiguously convey his desired input request for moving the pointing symbol. The device of the first preferred embodiment is convertible in that it supports input in 2D mode in a first position, as well as in 3D mode in a second position. A technique for converting between the modes is defined, whereby the user can quickly and easily change from one to the other. This is enables the user to provide input in 6 degrees of freedom, or in 4 degrees of freedom, using only one device. Further, continuous rotation in the +Z and −Z directions is supported. The device of the second preferred embodiment uses a sliding pointer stick, which the user slides up and down to indicate +Z and −Z input.

Figure 1:
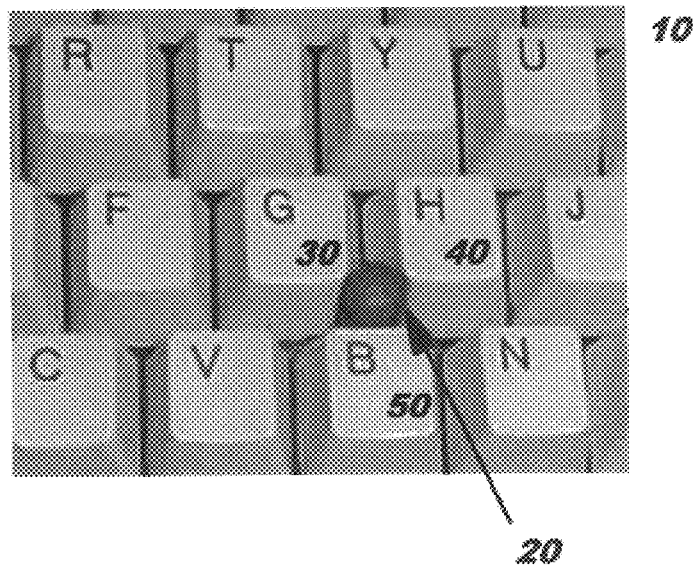
FIG. 1 is an image of a pointer stick device on a portion of a computer keyboard, shown in the 2 dimensional mode, as is known in the prior art.

FIG. 1 illustrates a portion of a typical computer keyboard 10, showing a pointer stick device 20 of the prior art, located within the keyboard between the "G" 30, "H" 40, and "B" 50 keys. The pointer stick device 20 is fully integrated in, and considered part of, the physical keyboard 10. However, this device typically provides input only in 2 dimensions (the X and Y axes). Those familiar with the art are aware of such 2 dimensional pointer stick devices, fully integrated in keyboards of portable computers. The TrackPoint technology from IBM is one example. The techniques with which the user's movement of a pointer stick device is translated into X and Y coordinate information usable by a computer are well known in the art, and will not be further described herein.

The preferred embodiments of the present invention will allow for current 2 dimensional operation to manipulate objects or images on a computer display screen, as provided by existing pointer stick devices, and extends the functionality of such a device to include 3 dimensional use of the pointer stick device. In a first embodiment, the extra 2 degrees of freedom are provided by enabling the pointer stick to pop up slightly above the height of the surrounding keys. The specific height to which the pointer stick pops up does not form part of the present invention. What is required is that sufficient upward movement is provided to allow the user to clearly detect that he has changed from one input mode to the other. A height of ¼ inch is expected to be sufficient for this purpose, although more or less upward movement may be provided. In a second embodiment, the stationary position of the pointer stick is raised slightly, to enable the user to press downward on the device in order to signal movement along the Z axis for a first additional degree of freedom. The second additional degree of freedom is then signalled by pulling upward on the pointer stick.

In the first preferred embodiment, the pointer stick is implemented as a spring-loaded device. Such techniques are well known in the art, and are used for devices such as ballpoint pens. The user preferably pops up the spring-loaded pointer stick by pressing down on it, causing it to release and pop upward. This change in position is detected by the circuitry that connects the pointer stick to the computer. The user can then use this device by grasping it, for example between his thumb and forefinger, and then rotating the stick to the right or left (i.e. in a clockwise or counter-clockwise direction, respectively). These rotation signals are communicated through the circuitry, and interpreted accordingly to indicate Z axis movement. The specific significance of rotating in either the clockwise or counterclockwise direction may be defined by an application. For example, clockwise rotation may be interpreted as moving in the +Z direction, while counterclockwise rotation is interpreted as moving in the −Z direction. Alternatively, the rotation may be interpreted as movement in the opposite directions, where clockwise rotation is the −Z direction, without deviating from the inventive concepts of the present invention.

Figure 2:
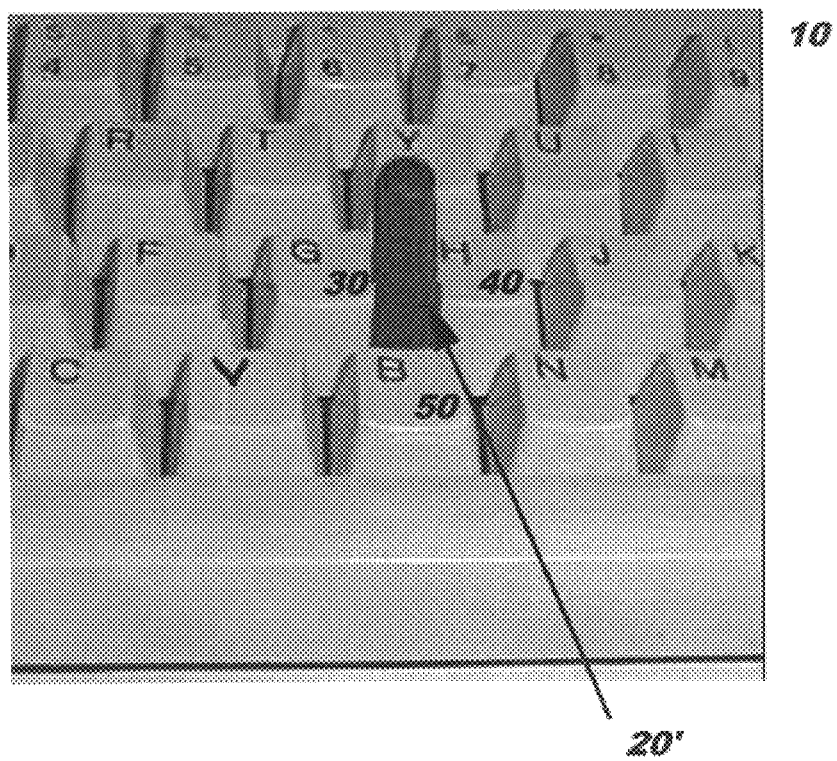
FIG. 2 is an image of the same keyboard with the pointer stick device shown in the 3 dimensional mode, according to a first embodiment of the present invention.

FIG. 2 depicts an image of the same keyboard 10 shown in FIG. 1, but with the pointer stick device 20' shown in the 3 dimensional mode, according to the first preferred embodiment of the present invention. The figure shows the device 20' as being raised slightly above the keys 30, 40, 50, which indicates the conversion to 3D input mode has been made. This figure further shows that the device 20' is completely integrated into the keyboard 10, removing the need for the user to provide and to operate a separate 3D input device.

In the first preferred embodiment, continuous rotation of the pointer stick is enabled. This continuous rotation continually moves the cursor position on the Z axis, until the user stops the rotating action. While the pointer stick is in the raised, or 3D, mode, movement in the X and Y directions is provided in the conventional manner, whereby the user pushes the stick left or right, forward or backward. To convert back to the 2D input mode, the user simply presses down on the pointer stick, until it catches in its "unsprung" position.

Figure 3:
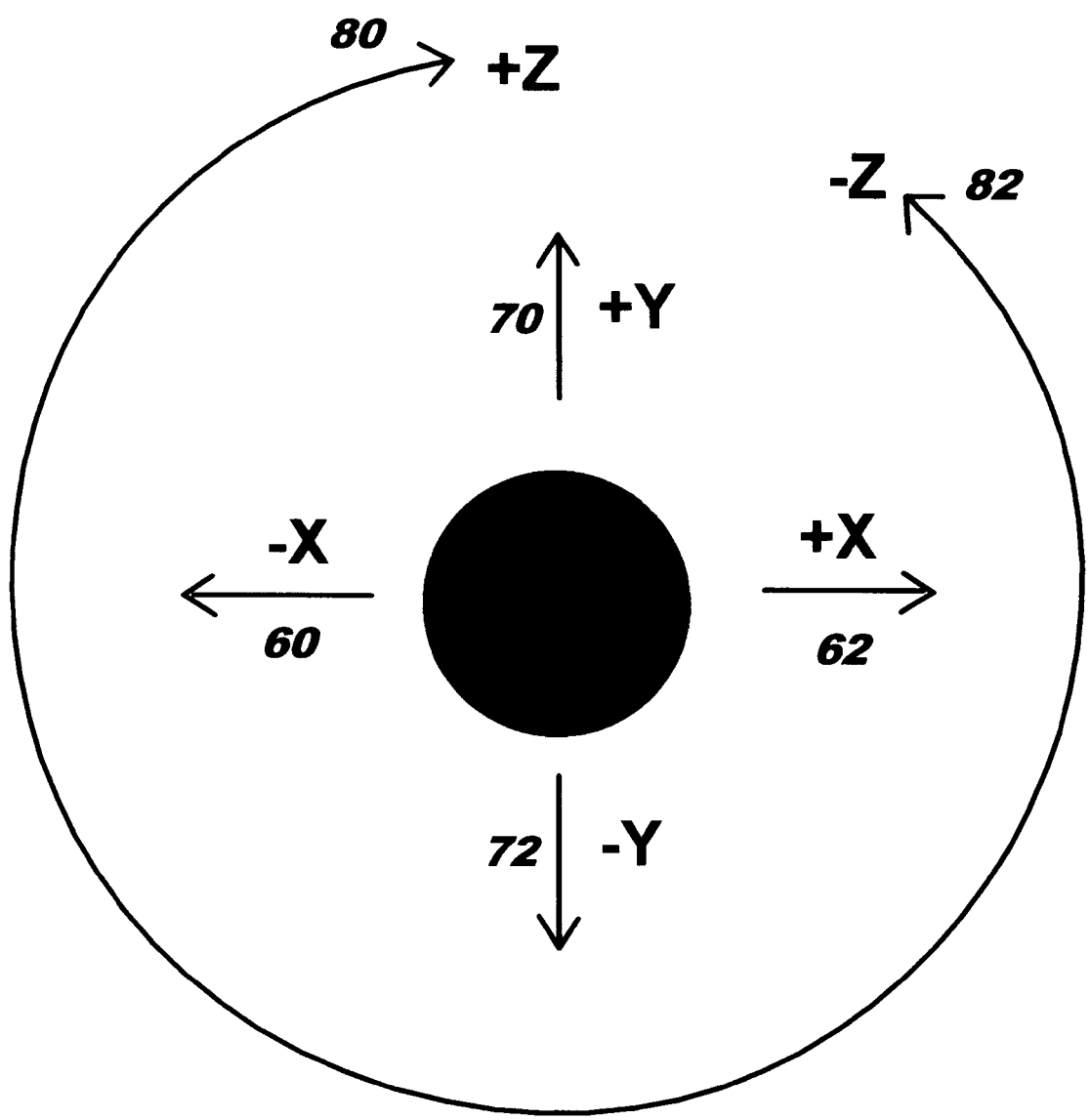
FIG. 3 is an illustration of the X, Y, and Z axes as described and used by this invention.

FIG. 3 conceptually illustrates the 2D and 3D input movements which are available with the pointer stick device of the present invention. The X and Y axes are depicted as left and right movements, and up and down movements, respectively, and the Z axis is depicted by the rotation of the pointer stick device clockwise and counterclockwise. Considering the left and right movement of the pointer stick device 20 along the X axis 60 and 62, for example, movement to the left can be denoted as −X (minus X) 60 while movement to the right can be denoted as +X (plus X) 62. Considering the up and down movement of the pointer stick device 20 along the Y axis 70 and 72, movement of the pointer stick device 20 forward can be denoted as +Y (plus Y) 70, moving the cursor in an upward direction. Movement of the pointer stick device 20 backward can be denoted as −Y (minus Y) 72, causing the cursor to move in the downward direction. In the first preferred embodiment, when the user or operator wishes to include the Z axis 80 and 82 for 3 dimensional application use, the user would simply rotate the pointer stick device 20' in the +Z or −Z direction. As shown in FIG. 3, rotating the device in a clockwise motion indicates movement in the +Z direction 80, while rotation in a counterclockwise motion indicates movement in the −Z direction 82. Techniques for translating these types of movement initiated by a user into signals usable by a computer, and communicating those signals to the computer, are well known in the art. In the second embodiment, the user indicates +Z and −Z input by pushing and pulling on the pointer stick, which has not been shown in FIG. 3. As with the first preferred embodiment, an application may interpret which direction of movement is used for +Z input, and which is used for −Z input.

Figure 4A:
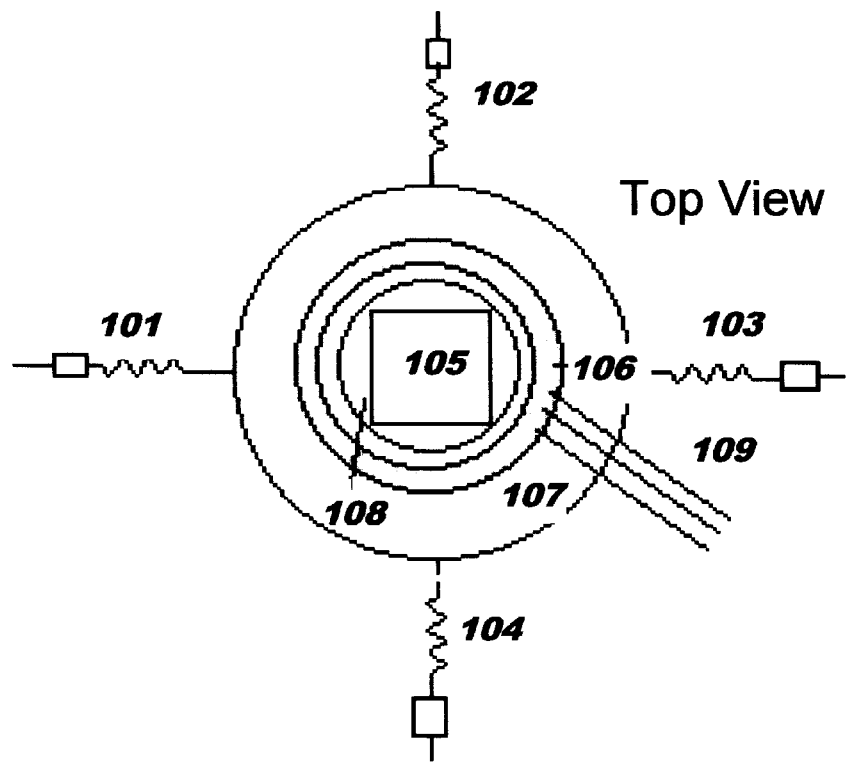
FIGS. 4A–4C depict the electrical and mechanical aspects of a first embodiment of the present invention, whereby Z-axis input uses rotation of the pointer stick device.
Figure 4B:
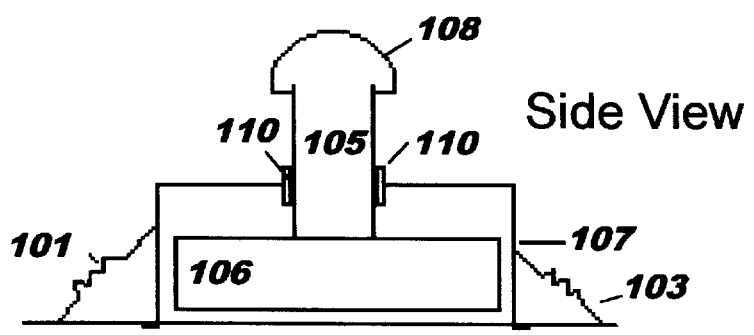
Figure 4C:
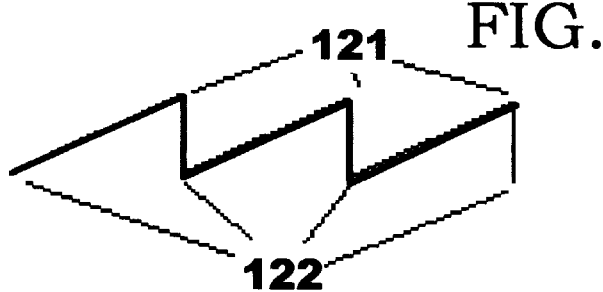

FIGS. 4A–4C depict the mechanical and electrical aspects of the first preferred embodiment, whereby Z-axis input is signalled by rotation of the pointer stick device in clockwise and counterclockwise directions. This Z-axis input technique is available after the user has converted the device to 3D mode by popping it up into the raised position. FIG. 4A shows a top view of the device, and FIG. 4B shows the same device from the side view. The base 107 of the pointer stick of the first preferred embodiment contains a continuous-turn potentiometer 106. Use of this potentiometer enables the user to continuously rotate the pointer stick in either direction. Connected to the top of the potentiometer is the pointer stick armature 105. The top of the pointer stick is preferably a resilient rubber tip 108. The armature 105 is supported by bearings 110. The material composition of the base 107 is preferably a flexible plastic. As the pointer stick is flexed in the X and Y directions, strain gauges 101, 102, 103, 104 measure the X and Y movement, using techniques which are well known in the art. The armature 105 of the pointer stick contains a spring push-to-raise, push-to-collapse mechanism, similar to that used for a standard ballpoint pen. Once the user has popped up the pointer stick, it may be rotated. As the armature 105 is rotated, the resistance of the potentiometer 106 is varied. This resistance is registered using electrical connections 109. FIG. 4C depicts the nature of how resistance increases and resets, in a saw-tooth pattern. At the beginning of a turn (zero degrees), the potentiometer is at minimum resistance 122. At the end of a turn (359 degrees), the potentiometer is at maximum resistance 121. Each tooth in FIG. 4C corresponds to a revolution of the potentiometer. The sensing electronics monitor how the resistance increases and decreases, and translate this into +Z and −Z axis movements, using techniques which are known in the art.

Figure 5A:
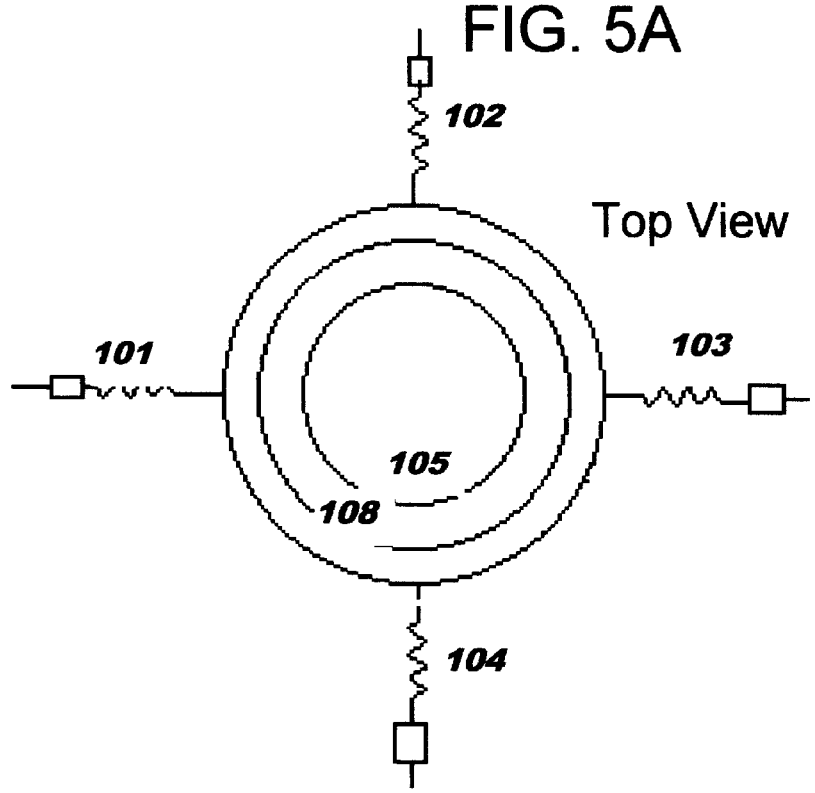
FIGS. 5A–5C depict the electrical and mechanical aspects of a second embodiment of the present invention, whereby Z-axis input uses push and pull movement of the pointer stick device.
Figure 5B:
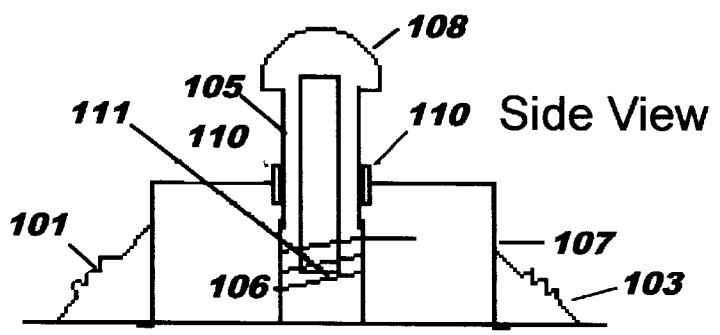
Figure 5C:
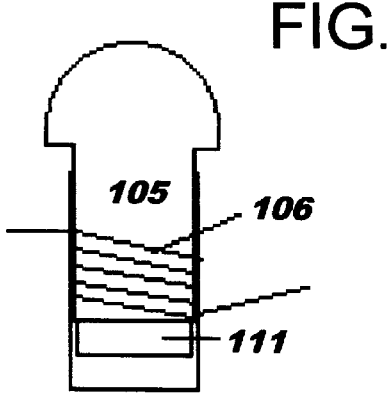

FIGS. 5A–5C depict the mechanical and electrical aspects of the second preferred embodiment, whereby Z-axis input is signalled by pushing and pulling the pointer stick device. FIG. 5A shows a top view of the device, and FIG. 5B shows the same device from the side view. In this embodiment, the user grasps the pointer stick, and pulls it upward to register input in one Z direction and pushes down on it to register input in the opposite Z direction. Typically, the upward motion will be interpreted as +Z input, and the downward motion will be interpreted as −Z input. As shown in FIGS. 5a and 5b, the pointer stick armature 105 consists of a two-piece telescopic assembly, where the upper section slides in and out of the lower section similar to a telescoping radio antenna. The assembly is preferably a plastic material. Concentric with the upper part of the assembly is magnet 111, which is suspended into the lower part of the assembly. As the user pulls and pushes the armature 105, the magnet 111 rides in and out of the electrical coil 106. FIG. 5C shows this in more detail, where magnet 111 is shown as being positioned at the bottom of the coil 106, in response to the user having pushed downward on the pointer stick. The movement of the magnet 111 through the coil 106 generates a voltage in the coil. Changes in the voltage are translated into relative positions along the Z axis. The armature 105 may also be flexed along its X and Y axes, with movement being measured by strain gauges Note that while the second preferred embodiment is depicted in FIGS. 5A–5C as using a magnet and coil to detect upward and downward movement, other approaches to detecting movement may be used equivalently. For example, a light-emitting diode (LED) could be used, where the light could be measured at the bottom of the pointer stick armature 105. Or, a magnetometer could be used in place of the magnet and coil, where a magnetometer is a device for measuring magnetic intensity that is known in the art.

While the third axis has been described herein as enabling input in a third dimension for a third axis of a 3D image, the additional 2 degrees of freedom may be used for other purposes as well. For example, the third axis control may be used in a "dial" mode, to control color intensity of images displayed on a screen. By rotating, or dialing, the pointer stick of the first embodiment clockwise, a darker color may be requested, where rotation in the opposite direction indicates selection of a lighter color. Or, the additional axis could be used to further manipulate an image rendered in 2 dimensions. By rotating the pointer stick in one direction, the image may be magnified (or zoomed), while rotating in the opposite direction shrinks the size of the 2D image. Similar techniques may be used with the second embodiment.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. An improved controller device for manipulating objects on a display screen of a computing device, comprising:
    an input mechanism which is integrated into a keyboard of said computing device as a pointer stick device;
    means for converting, by a user of said computing device, said input mechanism between a 2-dimensional input mode and a 3-dimensional input mode by pressing down on said pointer stick device to alternately release said pointer stick device from an initial 2-dimensional input mode position into a position signifying said 3-dimensional input mode or lock said pointer stick device in said initial 2-dimensional input mode position signifying said 2-dimensional input mode, and wherein input signals in a third dimension are allowed only when said pointer stick device is in said 3-dimensional input mode;
    means for moving said pointer stick device left and right and backward and forward, by said user, to provide input signals in a first dimension and a second dimension;
    means for rotating said pointer stick device, by said user, to provide input signals in said third dimension when said pointer stick device is in said 3-dimensional input mode; and
    means for providing said input signals to said computing device, wherein said input signals indicate said user's request to move a pointer symbol on said display screen.

2. The device according to claim 1, wherein said user rotates said pointer stick device in a first direction to indicate a +Z axis signal, and in a second direction which is opposite to said first direction to indicate a −Z axis signal.

3. The device according to claim 1, wherein said user rotates said pointer stick device in a first direction to dial through hues of increasing color intensity from a color palette and in a second direction which is opposite to said first direction to dial through hues of decreasing color intensity from said color palette.

* * * * *